United States Patent [19]
Atkinson

[11] Patent Number: 5,670,710
[45] Date of Patent: Sep. 23, 1997

[54] FLUID QUANTITY GAUGING SYSTEMS

[75] Inventor: Harry Atkinson, Wokingham, England

[73] Assignee: Smiths Industries PLC, London, England

[21] Appl. No.: 716,622

[22] Filed: Sep. 19, 1996

[30]    Foreign Application Priority Data

Oct. 4, 1995 [GB] United Kingdom ............... 9520235.4

[51] Int. Cl.⁶ ................................................... G01N 33/20
[52] U.S. Cl. ........................................ 73/61.45; 73/290 V
[58] Field of Search .......................... 73/1 H, 61.45, 73/627, 290 V, 290 R

[56]    References Cited

U.S. PATENT DOCUMENTS

| | | | |
|---|---|---|---|
| 3,859,846 | 1/1975 | Asada et al. | 73/627 X |
| 4,236,406 | 12/1980 | Reed et al. | 73/61.45 |
| 4,596,136 | 6/1986 | Zacharias | 73/61.45 |
| 4,715,226 | 12/1987 | Dorr . | |
| 4,726,221 | 2/1988 | Tavlarides et al. | 73/61.45 |
| 5,036,703 | 8/1991 | Eriksson | 73/290 V |
| 5,127,266 | 7/1992 | Maresca et al. | 73/290 V |
| 5,309,763 | 5/1994 | Sinclair | 73/290 V |

*Primary Examiner*—Elizabeth L. Dougherty
*Attorney, Agent, or Firm*—Pollock, Vande Sande & Priddy

[57]    ABSTRACT

An ultrasonic fuel gauging system has several ultrasonic transducers mounted on the bottom of a tank, the transducers being unconstrained by any tube or still well so that they each propagate diverging energy upwardly to the fuel surface. Each transducer receives a reflection of its own propagated energy from a region of the fuel surface directly above and also receives energy from others of the transducers reflected from regions of the fuel surface between those directly above the transducers. Using three transducers, the heights of six different regions of the fuel surface can be computed.

13 Claims, 2 Drawing Sheets

FLUID QUANTITY GAUGING SYSTEMS

BACKGROUND OF THE INVENTION

This invention relates to fluid quantity gauging systems.

The invention is more particularly concerned with ultrasonic or other acoustic systems for measuring the height of fluids.

Ultrasonic apparatus can be used to measure the height of a liquid or other fluid in a container. A transducer located towards the lower end of the container generates pulses of acoustic energy directed upwardly towards the surface of the liquid. When the energy meets the interface between the liquid and the air or other gas above the liquid, a part of the energy is reflected back to the transducer. Associated electronics measures the time between transmission of a pulse and reception of the reflected pulse and, from this, measures the height of liquid above the transducer. If the liquid container is fixed, such as an underground fuel storage tank, a single transducer is sufficient to enable the height, and hence the quantity, of liquid to be measured. If the container is not stationary, such as in a vehicle, the angle of the liquid surface relative to the container will change with change in attitude or acceleration. For this reason it is usually necessary to have several liquid-gauging probes in each container so that the height of liquid at different points, and hence the angle of the fuel surface, can be calculated. The more probes used, the greater is the accuracy with which the angle of the fuel surface can be calculated, because the fuel surface is not usually completely flat, as a result of waves or other motion. The ultrasonic probes usually have a tube or still well extending above the transducer, which is filled with the liquid to the same height as liquid outside the transducer. The purpose of the tube is to damp waves on the surface of the liquid and to confine energy within the tube so that adjacent probes do not interfere with each other. The use of tubes does, however, increase weight and makes it more difficult to mount the probes. Examples of ultrasonic gauging systems are described in GB 2270160, GB 2265005 and GB 2265219.

BRIEF SUMMARY OF THE INVENTION

It is an object of the present invention to provide an improved quantity gauging system.

According to one aspect of the present invention there is provided a fluid quantity gauging system for gauging the height of an interface between two fluids of differing acoustic properties, the system including a first acoustic transducer arranged to propagate diverging acoustic energy towards the interface and to receive acoustic energy from the first transducer reflected from a first region of the interface, a second acoustic transducer spaced from the first transducer, the second transducer being arranged to propagate diverging acoustic energy towards the interface and to receive acoustic energy from the second transducer reflected from a second region of the interface spaced from the first region, the first transducer being arranged to receive acoustic energy from said second transducer reflected from a third region of the interface spaced from the first and second regions, and the system including means for calculating the height of the first, second and third regions from the acoustic energy received by the first and second transducers.

The second transducer may be arranged to receive energy from the first transducer after reflection from the third region, the means for calculating height being arranged to calculate the height of the third region both from the energy received by the first transducer and from the energy received by the second transducer. Preferably the system also includes a third transducer located away from a line joining the first and second transducers, the third transducer being arranged to propagate diverging acoustic energy towards the interface and to receive energy from the third transducer reflected from a fourth region of the interface, the means for calculating height being arranged to calculate the height of the fourth region from the energy from the third transducer received by the third transducer. The first transducer may be arranged to receive energy from the third transducer reflected from a fifth region of the interface, the means for calculating height being arranged to calculate the height of the fifth region from the energy from the third transducer received at the first transducer. The second transducer may be arranged to receive energy from the third transducer reflected from a sixth region of the interface, the means for calculating height being arranged to calculate the height of the sixth region from the energy from the third transducer received at the second transducer.

According to another aspect of the present invention there is provided a fluid quantity gauging system for gauging the height of an interface between two fluids of differing acoustic properties, the system including at least three transducers located at apexes of a triangle, each transducer being arranged to propagate diverging acoustic energy towards the interface and to receive energy from that transducer reflected from three different respective regions of the interface, each of the transducers being arranged to receive energy from a different one of the others of the transducers reflected from a respective one of three further different regions of the interface, and the system including means for calculating the heights of the six regions from the energy received by the three transducers.

The system may include four transducers located asymmetrically of one another. The transducers are preferably arranged to propagate a substantially hemispherical wavefront. The system may include a reflector assembly mounted above one of said transducers so as to reflect acoustic energy back to said one transducer from a fixed height. The reflector assembly preferably includes a plurality of reflectors mounted one above the other to reflect acoustic energy back to said one transducer from a plurality of fixed heights. The reflector assembly preferably has at least three substantially quadrant-shape legs joined with one another, the one transducer being located at the center of curvature of said legs such that acoustic energy is reflected from each point along said legs at the same time. The transducers are preferably mounted inside a tank containing said fluid.

Several ultrasonic fuel-gauging systems in accordance with the present invention will now be described, by way of example, with reference to the accompanying drawings.

DETAILED DESCRIPTION OF THE PREFERRED EMBODIMENTS

Figure 1:
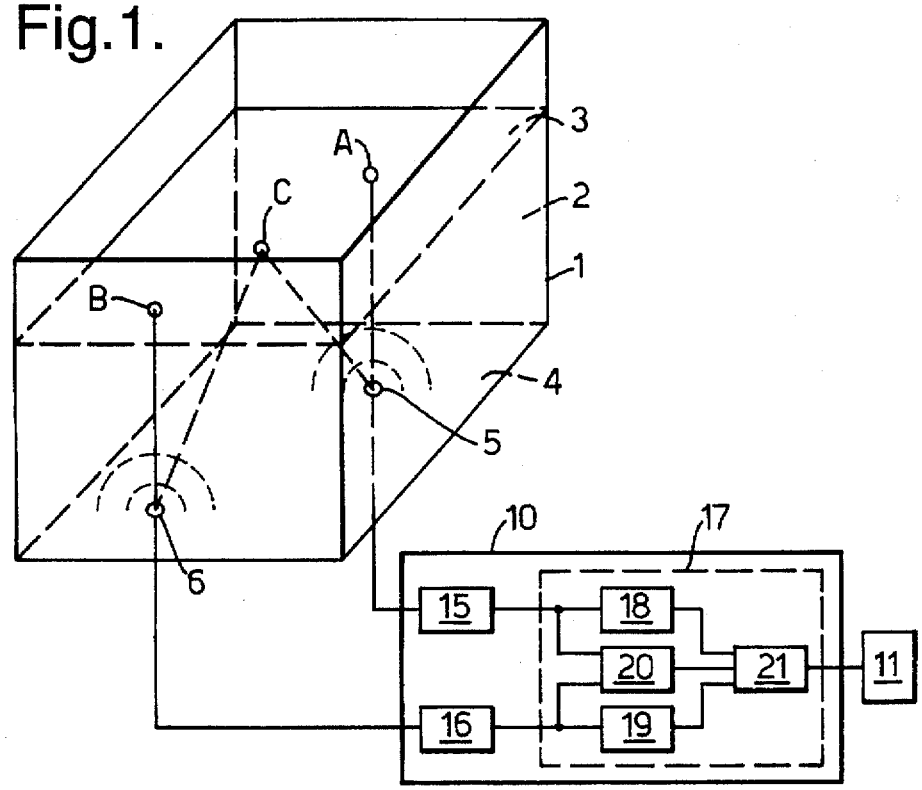
FIG. 1 is a perspective view showing schematically a system employing two transducers.

With reference to FIG. 1, there is shown a fuel gauging system according to the present invention in its simplest form. The system comprises a fuel tank 1 containing fuel 2, the space above the fuel surface 3 being filled with air. Two transducers 5 and 6 are mounted inside the tank, on its floor 4, at locations spaced from one another. The transducers 5 and 6 are ultrasonic transducers that propagate ultrasonic/ acoustic energy with a hemispherical wavefront, or some other divergent pattern, so that the energy impinges on a relatively large area of the fuel surface above the transducers. The transducers 5 and 6 are piezoelectric devices and may have a piezoelectric element of hemispherical shape between two electrodes so that they produce a hemispherical wavefront when energized. The transducers 5 and 6 are not confined in a tube or still well, so that the propagated energy is unconstrained, that is, it is free to diverge until it meets the interface between the fuel 2 and the air. Because the fuel and air have different acoustic properties, a part of the ultrasonic energy will be reflected at the interface. Each transducer will receive energy reflected from the surface, originating both from itself and from the other transducer. The spacing between the two transducers 5 and 6 is selected to be as great as possible while ensuring that each transducer can receive energy from the other transducer reflected off the fuel surface for a maximum range of fuel heights.

The two transducers 5 and 6 are connected to an electronics unit 10, which provides a fuel quantity output to a display 11 or other utilization means. The electronics unit 10 includes a first transmit/receive unit 15 connected to the transducer 5 and a second transmit/receive unit 16 connected to the other transducer 6. The two transmit/receive units 15 and 16 supply electrical energy to the transducers 5 and 6, in the usual way, to drive them to produce bursts of acoustic energy at ultrasonic frequencies, and to receive electrical signals from the transducers arising from reception of ultrasonic energy. The outputs of the transmit/receive units 15 and 16 are supplied to a calculating unit 17. A first circuit 18 within the calculating unit 17 receives the output of the transmit/receive unit 15 and calculates the height Ha of fuel in a region A directly above the transducer 5, from the time between transmission of an energy burst from the transducer and its reception at that transducer after reflection from the fuel surface. Similarly, a second circuit 19 calculates the height Hb of the region B of fuel above the other transducer 6. A third circuit 20 receives the outputs from both transmit/receive units 15 and 16. The third circuit 20 utilizes the time between transmission of a pulse from the transducer 5 and its reception at the other transducer 6, after reflection from a region C of fuel surface between the two regions A and B, to compute the height Hc of the region C, from knowledge of the separation between the two transducers. The region C will be equally spaced between the regions A and B when the fuel surface is parallel with the floor 4 of the tank 1 but will move closer to one of the regions A or B as the fuel surface tilts. The third circuit 20 may also, optionally, compute the height Hc from the time between transmission of a pulse from the transducer 6 and its reception at the transducer 5 after reflection from the same region C. This computation of the height Hc can be used to confirm the first calculation of He or to produce an average value of height. Alternatively, it may be used instead of the first calculation, such as, if one of the transducers should have a partial mode failure (such as, for example, be able to transmit but not receive). The electronics unit 10 also includes a further circuit 21, which receives the information about the heights Ha, Hb and Hc from the circuits 18 to 20 and calculates the volume of fuel present from knowledge of the tank geometry. Instead of using separate circuits to perform the various calculations, a processor or software can be used to perform several of the calculations. Arrangements for computing volume of liquid from heights at different locations in an irregular tank are well known. It will be appreciated that the system may include inputs from other sensors, such as densitometers, or the like, as is well known, to enable fuel mass to be calculated.

The system described above enables height measurements at three different locations to be obtained using only two transducers. The three locations are, however, located on a common line, so this information does not uniquely identify the attitude of the fuel surface, although the information may give a sufficiently accurate measure of fluid quantity where the tank is narrow and elongated along the line joining the two transducers. Where it is necessary to know the attitude of the fluid/air interface uniquely, it is necessary to use at least three transducers, as shown in FIG. 2.

Figure 2:
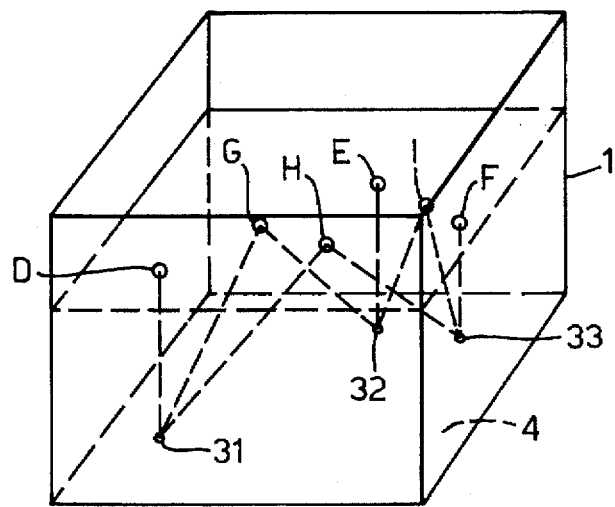
FIG. 2 is a perspective view showing a tank with three transducers.

The three transducers 31 to 33 shown in FIG. 2 are located at the apexes of a triangle on the floor of the tank 1, that is, each transducer is located away from a line joining the other two transducers. The transducers 31 to 33 generate diverging acoustic energy upwardly to the fuel/air interface above them. Each transducer 31 to 33 receives energy reflected from a respective region D, E or F of the fuel surface directly above the respective transducer; the times to reception of these reflected signals are used to calculate the heights of fuel Hd, He and Hf, in the usual way. Because of the diverging nature of the energy transmitted by each transducer 31 to 33, and the fact that this energy is unconfined by still wells, each transducer also receives energy from the other two transducers by reflection from the fuel surface. More particularly, transducer 31 receives energy from transducer 32 after reflection from the region G (between regions D and E), and energy from transducer 33 after reflection from the region H (between regions D and F). Transducer 32 receives energy from transducer 31 after reflection from the region G and energy from transducer 33 after reflection from the region I (between regions E and F). Transducer 33 receives energy from transducers 31 and 32 after reflection from the regions H and I respectively. The heights Hg, Hh and Hi are calculated from the outputs from the three transducers 31 to 33 produced by reflected energy from one of the other transducers. Thus, a total of six different heights can be calculated, enabling the location of the fluid/air interface to be determined uniquely.

Figure 3:
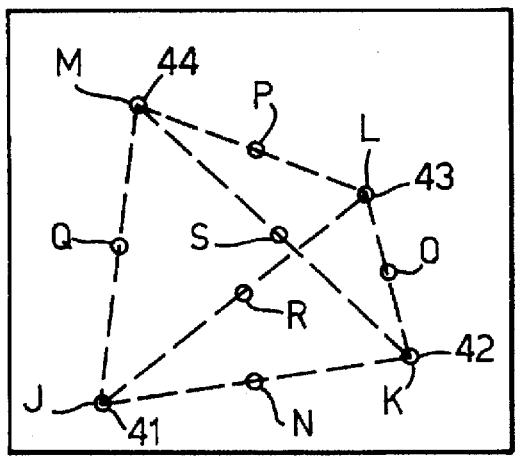
FIG. 3 is a plan view illustrating a tank with four transducers.

If four transducers 41 to 44 are used, as shown in FIG. 3, it is possible to measure ten different heights Hj to Hs of regions J to S of the fuel surface. Where more than three transducers are used, it is preferable for them to be located asymmetrically with respect to one another, so as to reduce the risk that pulses received at one transducer from the other transducers arrive at the same time.

With a conventional system, each probe only measures a single height, so four probes would yield four heights. Increasing the number of probes will increase the number of possible height measurements as shown below:

| Number of Probes | Number of height measurements |
| --- | --- |
| 1 | 1 |
| 2 | 3 |
| 3 | 6 |
| 4 | 10 |
| 5 | 15 |
| 6 | 21 |
| 7 | 28 |
| 8 | 36 |

| Number of Probes | Number of height measurements |
| --- | --- |
| 9 | 45 |
| 10 | 55 |

Because of the large number of height measurements possible with the present system, the number of transducers in each tank can be reduced with a consequent reduction in weight, installation problems and cabling.

Figure 4:
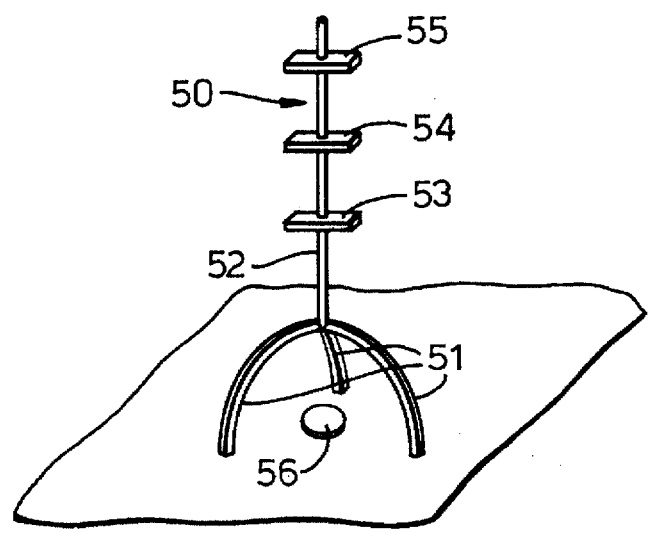
FIG. 4 is a perspective view of a reflector assembly for use with the transducers.

It is known in ultrasonic probes having a still well, to have reflectors mounted in the still well at known locations spaced from one another along the length of the still well. This enables a greater accuracy in the measurement of height, especially where there is stratification of the fluid, that is, different density layers caused by differences in temperature. An example of a probe having reflectors is described in GB 2265219. In the arrangement of the present invention, it is also possible to compensate for these stratification effects by the use of fixed reflectors. An open structure reflector assembly or stratification tower 50 of the kind shown in FIG. 4 may be used. This tower 50 has three quadrant-shape legs 51 extending radially from a center point and oriented at 120° to one another. The legs 51 support a mast 52, which projects vertically upwardly from the center point between the three legs 51 and supports three horizontal cross-pieces 53 to 55 at spaced intervals along the mast. A transducer 56 is located directly below the mast 52, at the center of curvature of the legs 51. The legs 51 and the cross-pieces 53 to 55 act as reflectors. The legs 51 will produce a large amplitude reflection because they will reflect the hemispherical wavefront from the transducer 52 at all points along the legs, simultaneously; the other reflectors will produce smaller amplitude reflections. Different numbers of reflectors can be used, as desired. It is not necessary for each transducer to have an associated stratification tower, since the effects of stratification at one transducer can be used to compensate the outputs of all the transducers.

It is possible for the transducers to be located on the outside of the tank and to propagate the acoustic energy through a transparent window in the floor, because no still wells are used. This facilitates installation, maintenance and replacement of the transducers.

It will be appreciated that the invention is not confined to measuring the height of a fuel/air interface but could be used for measuring the height of any interface between two fluids of different acoustic properties, for example, oil and water. The transducer could be mounted above the interface and propagate energy downwardly. The acoustic energy could be at frequencies outside the ultrasonic range.

What I claim is:

1. A fluid gauging system for gauging the height of an interface of variable height and attitude between two fluids of differing acoustic properties in a container, the system comprising: a first acoustic transducer arranged to propagate diverging acoustic energy towards the interface and to receive acoustic energy from said first transducer reflected from a first region of the interface; a second acoustic transducer spaced from said first transducer and arranged to propagate diverging acoustic energy towards said interface and to receive acoustic energy from said second transducer reflected from a second region of the interface spaced from said first region, said first transducer being arranged to receive acoustic energy from said second transducer reflected from a third region of said interface spaced from the first and second regions, and said system including means for calculating the height of each of said first, second and third regions from the acoustic energy received by said first and second transducers and for calculating the quantity of a fluid in said container between said transducers and said interface utilizing the calculated heights of each of said first, second and third regions.

2. A system according to claim 1, wherein said second transducer is arranged to receive energy from said first transducer after reflection from said third region, and wherein said means for calculating height is arranged to calculate the height of said third region both from the energy received by said first transducer and from the energy received by said second transducer.

3. A system according to claim 1 including a third transducer located away from a line joining said first and second transducers, said third transducer being arranged to propagate diverging acoustic energy toward said interface and to receive energy from said third transducer reflected from a fourth region of said interface, and wherein said means for calculating height is arranged to calculate the height of said fourth region from the energy from said third transducer received by said third transducer.

4. A system according to claim 3, wherein said first transducer is arranged to receive energy from said third transducer reflected from a fifth region of said interface, and wherein said means for calculating height is arranged to calculate the height of said fifth region from the energy from said third transducer received at said first transducer.

5. A system according to claim 3, wherein said second transducer is arranged to receive energy from said third transducer reflected from a sixth region of the interface, and wherein said means for calculating height is arranged to calculate the height of said sixth region from the energy from said third transducer received at said second transducer.

6. A fluid quantity gauging system for gauging the height of an interface of variable height and attitude between two fluids of differing acoustic properties, wherein the system includes three transducers located at apexes of a triangle, wherein each transducer is unconstrained so that it propagates diverging acoustic energy towards said interface and receives energy from the respective transducer reflected from one of a first three different respective regions of said interface, wherein each of said transducers is arranged to receive energy from a different one of the others of the transducers reflected from a respective one of three further different regions of the interface, said further regions being located between respective pairs of the first three regions, and wherein the system includes means for calculating the heights of said six regions from the energy received by said three transducers.

7. A system according to claim 1 including four transducers located asymmetrically of one another.

8. A system according to claim 1, wherein said transducers are arranged to propagate a substantially hemispherical wavefront.

9. A system according to claim 1, including a reflector assembly of open construction mounted above one of said transducers, said reflector assembly being arranged to reflect acoustic energy back to said one transducer from a fixed height.

10. A system according to claim 9, wherein said reflector assembly has a plurality of reflectors located one above the other to reflect acoustic energy back to said one transducer from a plurality of fixed heights.

11. A system according to claim 9, wherein said reflector assembly has at least three substantially quadrant-shape legs joined with one another, and wherein said one transducer is located at a center of curvature of said legs such that acoustic energy is reflected from each point along said legs at the same time.

12. A system according to claim 1, wherein said container is a tank containing the fluid whose quantity is to be calculated, said transducers being mounted inside said tank.

13. A fuel quantity gauging system for gauging the quantity of fuel in a vehicle tank wherein the height and attitude of an upper surface of the fuel are both variable, said system including three transducers located on a floor of the tank at apexes of a triangle, each transducer being unconstrained so that it propagates diverging acoustic energy upwardly towards said surface of the fuel and receives energy from the respective transducer reflected from one of a first three different respective regions of said fuel surface, each of said transducers being arranged to receive energy from a different one of the others of the transducers reflected from a respective one of three further different regions of the fuel surface, said further regions being located between respective pairs of the first three regions, and the system including a processor for calculating the heights of said six regions from the energy received by said three transducers and for calculating the fuel quantity from said heights.

* * * * *